March 6, 1973     W. E. SINDELAR     3,719,445

USE OF METAL WORKING PRESS FOR PLASTIC COMPRESSION MOLDING

Filed May 10, 1971     4 Sheets-Sheet 3

INVENTOR.
WILLIAM E. SINDELAR,
BY
Wolfe, Hubbard, Leydig, Voit & Osann, Ltd.
ATTORNEYS.

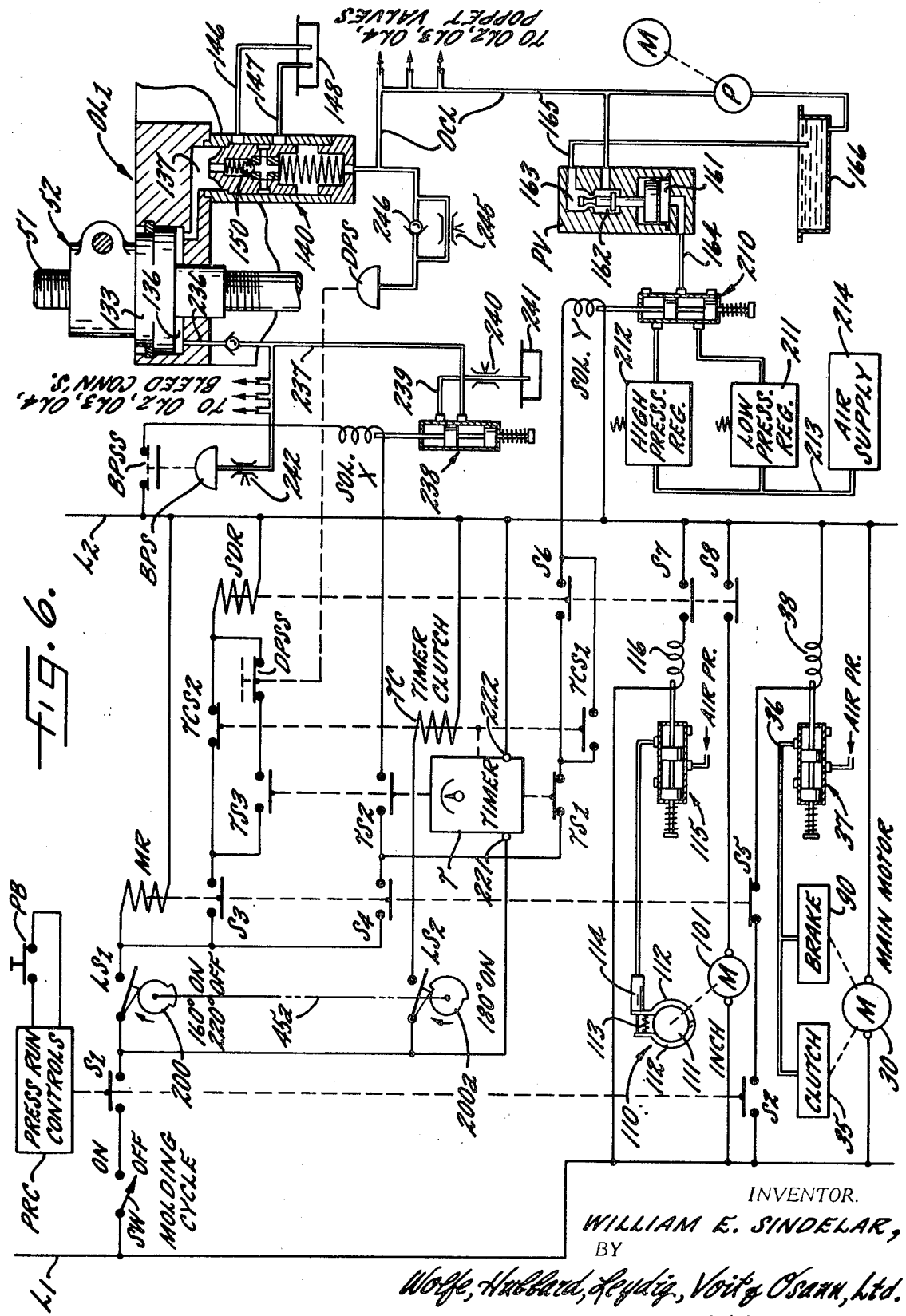

United States Patent Office 3,719,445
Patented Mar. 6, 1973

3,719,445
USE OF METAL WORKING PRESS FOR PLASTIC COMPRESSION MOLDING
William E. Sindelar, Westmont, Ill., assignor to Danly Machine Corporation, Chicago, Ill.
Filed May 10, 1971, Ser. No. 141,753
Int. Cl. B29h 5/24
U.S. Cl. 425—150
6 Claims

ABSTRACT OF THE DISCLOSURE

A press utilizing the press structure and controls of a metal working press but which is adapted for compression molding of large plastic parts on a production basis. Means are provided for driving the press slide slowly into bottom dead center (to be referred to herein as "dead center") position following rapid descent, for developing a high molding force, which may be substantially greater than the nominal rating of the press, and for sustaining that force during a curing interval. Pressure is reduced to a lower level to permit reestablishment of lubrication at the press bearings prior to moving the slide out of its dead center position for completion of the cycle. The hydraulic overload release device conventionally used is especially controlled to enable development of high molding pressure. In one embodiment molding pressure is developed by slow movement of the slide into its dead center position. In another embodiment the overload device is depressurized so that final movement of the slide into dead center occurs with only light loading, following which the requisite pressure is developed by pumping up the hydraulic overload release with the slide stationary. In both cases means are provided for bleeding fluid from the overload release mechanism to release the pressure on the slide before the slide begins to move out of dead center.

---

Metal working presses and presses intended for plastic compression molding have been considered distinct type neither suited, nor intended for, interchangeable usage. For example, in metal working presses the aim has been to continue motion through the dead center position to minimize cycle time, utilizing the energy stored in the flywheel to avoid a "stuck press." In a plastic molding press the slide, by contrast, must remain in its closed position, with the product under heat and high pressure, long enough for chemical curing to occur, usually a period of several minutes. Many shops and manufacturing plants which are equipped with only metal working presses have increasing need for making parts of reinforced plastic, for example automobile body components which have been formerly made of metal, e.g., by stamping or die casting.

It is an object of the invention to provide a control arrangement which may be easily added to the controls and overload protective devices conventionally provided in a metal working press for converting the press to one which is well suited for production of molded plastic pieces. It is a more specific object to provide a control arrangement in which a common type of hydraulic overload device is utilized in a novel way, both to generate forces which may intentionally exceed the nominal rating of the press and for releasing the pressure upon completion of the curing cycle to insure adequate lubrication at all points in the press.

It is an object of the invention, generally stated, to provide a control arrangement which may be added to a metal working press which enables such a press to be utilized to apply sustained pressure at a level higher than the nominal press rating, and which insures that the press will be adequately protected and lubricated for a long useful life.

It is a more specific object to employ an existing hydraulic overload device to actively increase and decrease the force applied by the slide during an operating cycle, as contrasted with the passive tripping action of an overload device used in the conventional way.

It is another object of the present invention to provide a control arrangement capable of converting a metal working press for plastic molding which does not substantially affect the regular running controls of the press and which may be easily switched between its alternate conditions.

It is yet another object to provide novel means for converting a metal working press to a compression molding press and which is capable of operating at a production rate which exceeds that of a regular molding press of comparable tonnage capacity.

Other objects and advantages of the invention will become apparent upon reading the attached detailed description and upon reference to the drawings in which:

FIG. 6 is a control diagram with the press converted for plastic compression molding.

While the invention has been described in connection with certain preferred embodiments, it will be understood that I do not intend to be limited to the particular embodiments shown but intend to cover the various alternative and equivalent constructions included within the spirit and scope of the appended claims.

Figure 1:
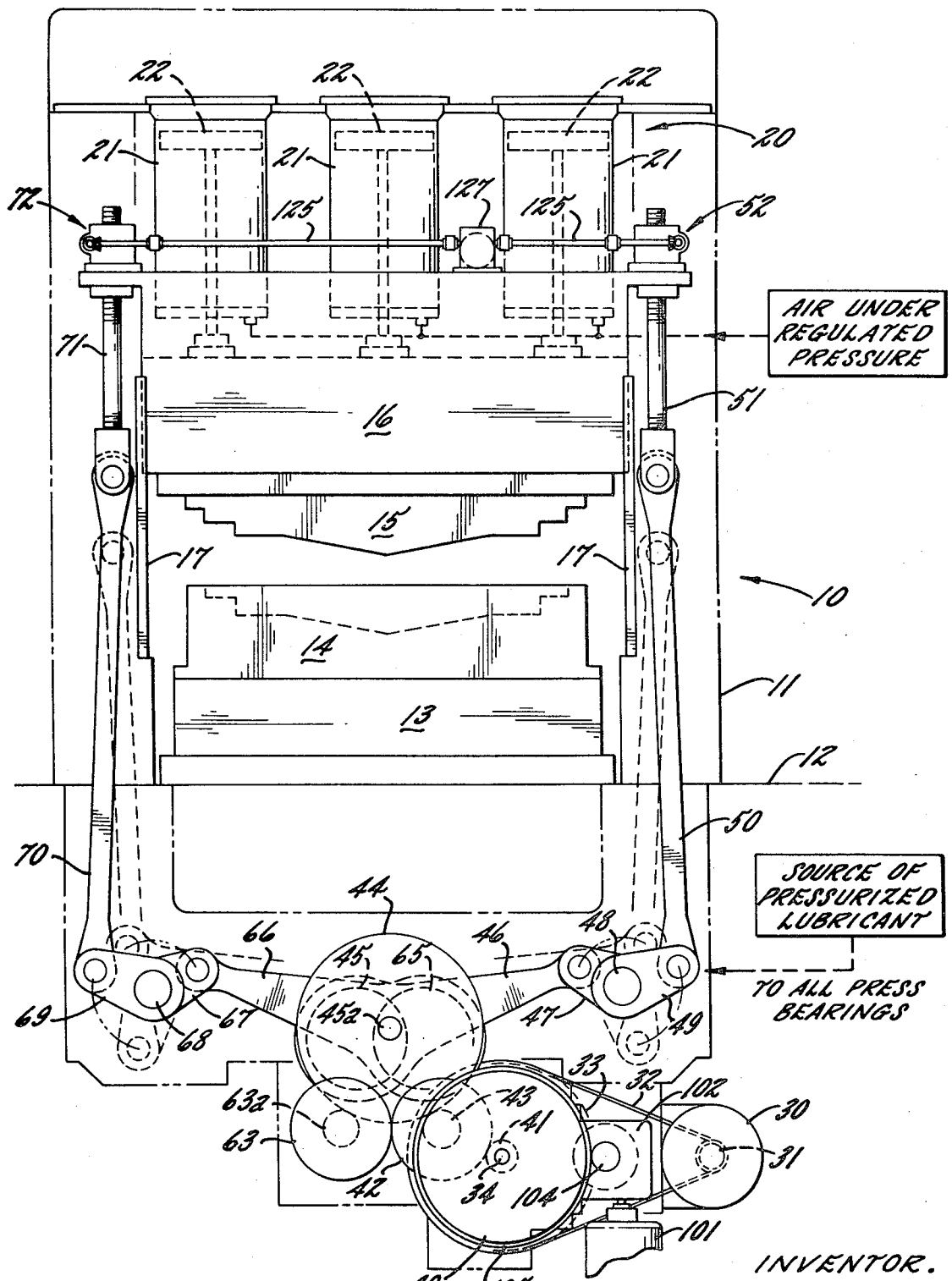
FIG. 1 is a diagrammatic front view of a metal working power press utilized in carrying out the present invention.
Figure 2:
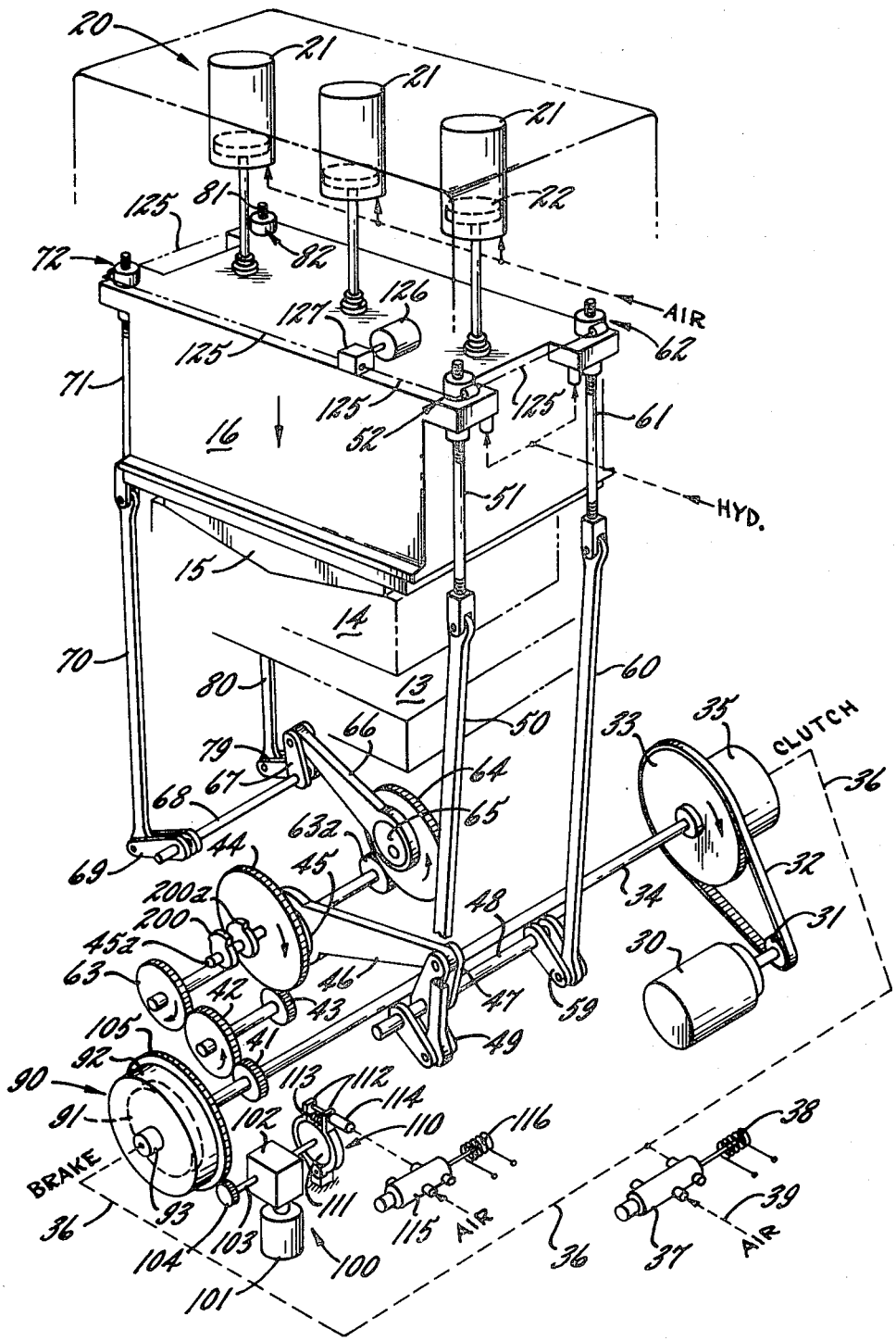
FIG. 2 is a perspective diagram showing the press of FIG. 1 and particularly the press driving elements.

Turning now to the drawings and particularly to FIGS. 1 and 2, there is shown a typical power press 10 to which the present invention has been applied. The press includes a frame 11 having an upstanding portion and a portion which extends below the level of the floor 12. Mounted on the lower portion of the frame is a bolster 13 which carries a lower mold section 14. Cooperating with the mold section 14 is a second or upper section 15 which is secured to a reciprocating slide 16 which is slidable vertically in ways 17. For counterbalancing the weight of the slide 16, including the weight of the upper mold section 15 secured thereto, the slide is provided with counterbalancing means 20 in the form of air cylinders 21 having pistons 22 and with air at regulated pressure being supplied by suitable means to the space below the piston. Any desired number of counterbalancing cylinders may be employed with the total piston area and air pressure being such that the weight of the slide is fully supported. Indeed, in carrying out the invention in one of its aspects it is desirable for a net upward force to be applied by the counterbalancing means to the slide.

For reciprocating the slide upwardly and downwardly a known type of driving mechanism is provided as set forth somewhat diagrammatically in FIG. 2. A main press drive motor 30 having a pulley 31 drives a belt 32 which is trained about a flywheel 33. Effectively interposed between the flywheel 33 and the main drive shaft, indicated at 34, is a clutch 35. The clutch 35 will be understood to be of the type conventionally used in the field of power presses and there is no need to spell out the structure in detail. It will suffice to say that the clutch is engaged whenever air pressure is applied via a supply line 36 fed from a valve 37 having a solenoid 38. The valve 37 is fed from a line 39 which is connected to a source of air under pressure.

The main drive shaft 34 has a pinion 41 which meshes with a gear 42 having a pinion 43. The latter in turn meshes with an eccentric drive gear 44 having an eccentric 45 which is encircled by a pitman 46. The shaft 45a of the eccentric performs the function of a crank shaft and may be referred to as such. The end of the pitman is connected to an arm 47 which is secured to a rocking shaft 48. A first crank 49 on the shaft 48 is pinned to a connecting rod 50. The upper end of the connecting rod 50 is pinned to a pull rod 51. The upper end of the latter is in turn coupled to the slide by means of an adjusting mechanism 52 which, as will be seen, includes an adjustable nut which is threaded onto the upper end of the rod.

Connected to the same rocking crank shaft 48 is a crank 59 which is pinned to a connecting rod 60 having a pull rod 61 which is coupled, at its upper end, to the slide by an adjusting mechanism 62.

For the purpose of applying downward force to the remaining two corners of the slide, a similar linkage is provided which includes a gear 63 having a pinion 63a which drives an eccentric gear 64 having an eccentric 65 and a pitman 66, the latter being connected by a crank 67 to a rocking shaft 68. The latter carries a crank 69 connected to a connecting rod 70 having a pull rod 71 coupled to the slide by an adjusting mechanism 72.

A crank 79 on the shaft 68 is connected to a connecting rod 80 having a pull rod 81 and adjusting mechanism 82.

It will be apparent, then, that as the motor rotates, with the clutch engaged, rotation of the shaft 34 produces synchronized rotation of the eccentrics 45, 65 and synchronized rocking of the shafts 48, 68. This results in simultaneous up-and-down movement of the connecting rods 50–80 and the pull rods 51–81 causing vertical reciprocation of the slide.

For the purpose of overcoming the inertia of the slide and its connected linkage, a brake 90 is connected to the drive shaft 34. The brake is of conventional construction and it will suffice to say that it includes a movable member, which may, for example, be in the form of a disc 91 and a relatively stationary member 92 which is coupled to the press frame. The brake includes an actuating device 93 connected to the air line 36 and which is so constructed that the brake is "fail safe," that is, the brake is disengaged as long as pressure exists in the air line 36 but it is engaged or "set" when the air is vented from the line 36, the venting being accomplished in the usual way within the valve 37.

In order to move the slide at a slow "inching" speed, a slow speed drive mechanism indicated at 100 is interposed between the member 92 of the brake and the press frame. Such slow speed drive connection, sold commercially under the trademark, Micro-Inching Drive, includes an auxiliary motor 101 having reduction gearing 102 providing a high reduction ratio and an output shaft 103. The latter carries a pinion 104 which meshes with a ring gear 105 which is integral with the relatively stationary member 92 of the brake. Thus when the clutch is disengaged and the brake 90 is set, rotation of the auxiliary drive motor 101, through the reduction gearing, produces slow rotation of the gear 105 and drive shaft 34, which slow rotation is reflected in slow vertical movement of the slide. In a typical case the slow speed may be 18 inches maximum, or less, per minute, being reduced to zero as the slide reaches dead center.

To prevent overtravel by the slow drive motor 101 when it is de-energized, an auxiliary brake 110 is provided having a brake drum 111 connected to the shaft 103 and which is encircled by shoes 112. The shoes are normally drawn together by a spring 113 but are capable of spreading apart by an actuator 114 which is furnished with air under pressure from an air valve 115 having a solenoid 116. When the motor 101 is turned on, the solenoid 116 is energized at the same time pressurizing the actuator 114 to release the brake. Subsequently, when the motor 101 is turned off, the solenoid 116 is de-energized venting the actuator 114 to set the brake.

Attention may next be given to the means for adjusting the pull rods in the hydraulic overload release devices provided at the four corners of the slide for permitting the slide to yield slightly in the event of overload.

Figure 3:
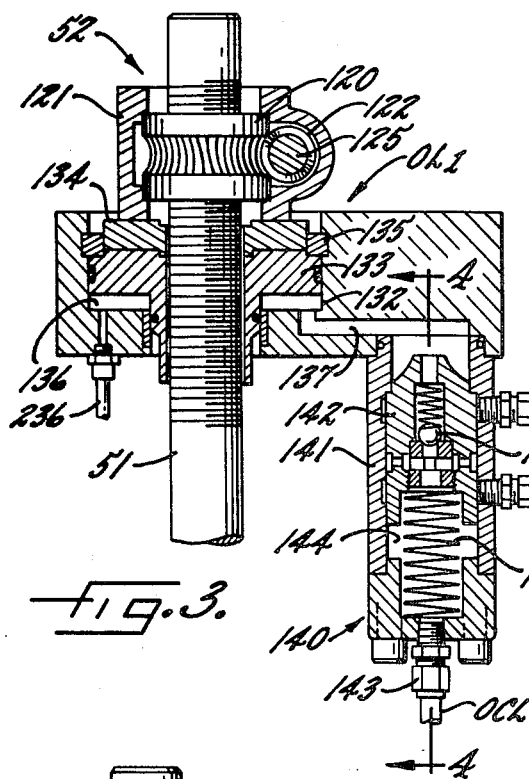
FIG. 3 shows the cross section of an overload device associated with one of the pull rods and in the normal, untripped condition.

Referring to the adjusting mechanism 52 associated with the pull rod 51, as shown in FIG. 3, it includes a nut 120 which is captive in a housing 121 and which is rotated, in one direction or the other, by a worm 122. It will be understood that all of the worms 122 in the adjusting devices 52–82 are driven by a common shaft 125 which is shown diagrammatically in FIG. 2, the shaft being rotatable by a reversible motor 126 having a set of reduction gears 127. Thus when the adjusting motor 126 is energized for rotation in one direction, all of the adjusting nuts 120 will be rotated in the appropriate direction and to precisely the same degree. Where the nuts 120 are screwed downwardly with respect to the pull rods which they engage, the effect is to shorten the pull rods and to increase the force which is applied between the mold sections when the slide is in its bottom dead center position. The term "bottom dead center position" as used herein refers to the fact that the eccentrics 45, 65 which drive the rocking crank shafts 48, 68 are on dead center, with the slide occupying its maximum downward position.

Continuing to refer to FIG. 3, a typical hydraulic overload release device OL1 is shown including a frame 131 which defines a cylinder 132 in which is slidable a piston 133 which is movable with the pull rod 51. For coupling the pull rod to the piston, the housing 121 which holds captive the nut 120 on the pull rod rests upon a pad 134 which in turn rests upon the piston. When the piston is in its illustrated normal position, upward movement being limited by a stop ring 135, it defines an annular space 136 in which a body of hydraulic fluid is confined. The pressure of the hydraulic fluid is, in a metal working press, maintained at a level which is sufficiently high so that the piston 133 continues to occupy the position shown during normal press operation but which is sufficiently low so that the space 136 may be taken up, and the fluid expelled, upon achieving a predetermined overload force permitting limited yielding movement of the slide relative to the pull rod. The amount of yielding referred to as the "thickness of interference protection," may in a typical case be on the order of one inch.

For the purpose of venting the hydraulic fluid under overload conditions a pressure controlled poppet valve is connected to the space 136 via a passage 137. This poppet valve, indicated at 140, has a poppet valve cylinder 141 and a poppet 142 slidable therein. For the purpose of admitting hydraulic fluid to the poppet valve and for applying control pressure, a connection 143 is provided to an overload control line OCL. The pressure of the fluid in the space 144 below the poppet, augmented by the force of the spring 145, serves to keep it in its upper or sealing position, in which it seals off vent lines 146, 147 which lead to a sump 148.

For admitting hydraulic fluid to the space below the piston, in other words for "pumping up" the cylinder, pressure fluid is admitted through a central passage formed in the poppet having a ball check valve 150.

Figure 4:
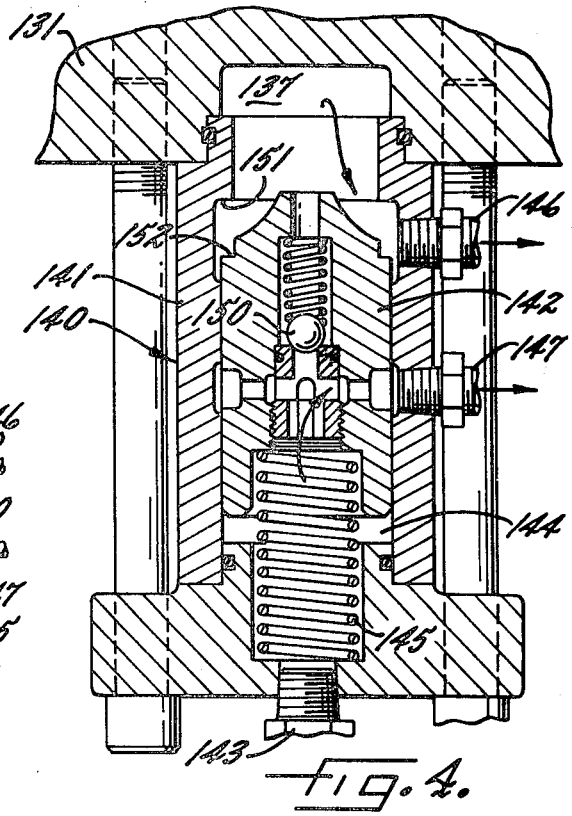
FIG. 4 is a fragmentary stop motion view showing unseating of the poppet of FIG. 3 and the subsequent flow of pressurized fluid.

Operation of the poppet valve in the face of an overload applied to the pull rod 51 will be made clear upon reference to FIG. 4. Assuming existence of a certain controlled pressure within the space 144 below the poppet, any substantial increase in the pressure of the fluid in the space above the poppet, due to overload, causes the poppet to move downwardly. The initial movement, as the poppet leaves the shoulder 151, exposes additional poppet area indicated at 152, causing the poppet to be quickly snapped to its lowermost position. This vents the fluid confined in the space below the piston through the vent line 146. At the same time the overload control line is vented through the line 147 so that the pressure in the overload control line OLC drops sharply. This causes simultaneous tripping of the overloads at the other three corners of the slide since the pressure in the line is no longer sufficient to sustain the poppets in their upper, sealing positions.

Figure 5:
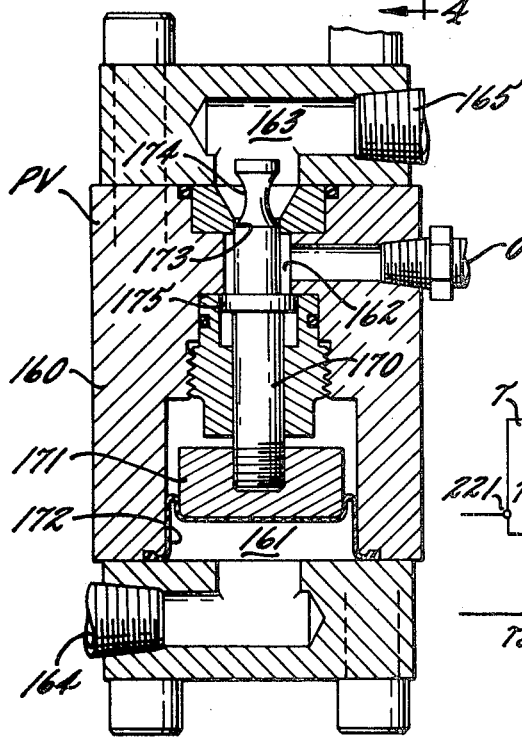
FIG. 5 is an enlarged cross sectional view showing the air controlled relief valve for maintaining an oil pressure proportional to air pressure with the elements in the fully closed condition for development of maximum oil pressure.

For the purpose of determining the pressure which exists in the space 144 below the overload release poppet, an air controlled relief valve, or proportioning valve, PV is provided which controls the hydraulic pressure in the line OCL in accordance with applied air pressure. Thus, rather than controlling the pressure in the line OCL directly by regulator, it is the air pressure which is regulated, and the regulated value of air pressure, applied to the valve PV, results in a regulated value of hydraulic fluid pressure. Referring to FIG. 5 the valve PV has a frame 160 defining a lower chamber 161, a middle chamber 162 and an upper chamber 163. The lower chamber is fed with compressed air via a line 164. The middle chamber is connected to the hydraulic line OCL, whose pressure is to be controlled, and the upper chamber is vented through a vent line 165 to a sump 166. The principle of the device is that air pressure in the lower chamber 161, acting against a valve plunger, and balanced against the pressure in the hydraulic overload line OCL controls the position of the plunger so that the plunger permits leakage from the hydraulic control line to the vent at a rate which is just sufficient to maintain a predetermined level of pressure in the hydraulic control line.

Thus, referring to FIG. 5, the plunger indicated at 170 has a piston 171 at its lower end which presses against a flexible diaphragm 172, air pressure thus tending to hold the plunger in its uppermost position. At its upper end the plunger cooperates with a land 173, which separates chambers 162, 163 and has an annular relief as indicated at 174. Along its length, and serving as a "floor" for the central chamber 162, the plunger carries an annular piston 175. The area of the piston bears a small but predetermined ratio to the area of the piston 171 which is acted upon by the air, so that the controlled hydraulic pressure may be substantially greater than the air pressure which serves as the controlling means.

Figure 5A:
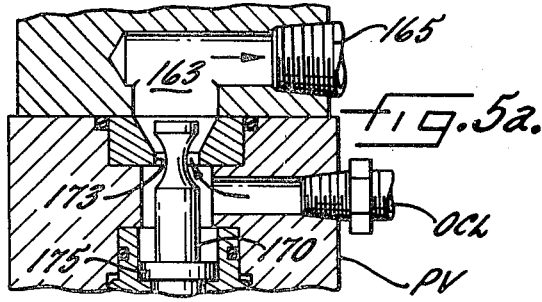
FIG. 5a is a sectional view similar to FIG. 5 but showing the relief valve fully open for development of minimum oil pressure.

It will be understood that the pump P, which is connected to the control line OCL, and which is driven by a motor M, is capable of producing a pressure which is greater than that required in the line OCL. This excess pressure, pressing downwardly upon the annular piston 175 against the force of the air pressure, moves the valve plunger downwardly until leakage occurs at the land 173 producing throttled discharge of fluid to the sump (FIG. 5a). When the back pressure within the chamber 162, applied to the piston 175, equals the pressure applied by the air, the plunger is in equilibrium and a predetermined pressure exists on the line OCL. Where it is desired to increase the hydraulic pressure in the line OCL, the air pressure is increased which moves the valve plunger up toward the land 173 to increase the back pressure in the chamber 162 so that equilibrium is established with a desired higher pressure in the control line OCL. Conversely, a decrease in the hydraulic pressure may be achieved by decreasing the air pressure applied at the inlet 164.

The controls which are employed in the safe operation of a press such as described above are well known and need not be described herein. It will suffice to say that three modes of operation are usually provided, a "run" mode, a "continuous" mode and an "inch" mode. In FIG. 6, which shows an embodiment of conversion control circuit constructed in accordance with the invention, the conventional press run controls are indicated diagrammatically in block form at PRC. The press will be assumed to be under control of a push button PB which results in closure of switches S1, S2. Switch S2, as will be seen, produces motion of the slide while switch S1, by its closure, turns control over to the conversion control circuit which is set forth in the remainder of FIG. 6. It will be understood that the press controls are in the "run" mode so that when the push button PB is pressed the press slide is driven downwardly and then upwardly to come to rest in its top position, requiring the push button to be pressed again to initiate a successive cycle. In the normal operation of a metal working press movement of the slide is continuous and it is desired to avoid any stoppage of the slide at its lower dead center position.

However, in accordance with the present invention, to be discussed in connection with FIG. 6, means are provided for intentionally disengaging the clutch 35 and setting the brake 90 as the dead center position is approached, with simultaneous energization of the slow drive motor and application of high pressure to the overload control line OCL so that a high pressure may be developed between the mold sections 14, 15 without tripping the overload, the high pressure being sustained for a sufficiently long time interval to effect curing of the molded product following which the fluid confined in the overload devices is intentionally vented or "bled" to permit a slight yielding of the slide thereby to reduce the reaction force on the slide, and reduce the pressure at the bearing surfaces, so that the lubricant, which has been squeezed out from between the bearing surfaces, can reenter. When the pressure drops to sufficiently low level the slow drive mechanism is reactivated to move the slide out of dead center position, following which the main press drive is reestablished for rapid return of the slide to its top position.

Turning to FIG. 6 it should be understood, first of all, that the conversion control circuit which is shown is exemplary only and has been greatly simplified in order to facilitate understanding the invention. It will be further understood that in a commercial version of the circuit additional safety features including interlocks would be incorporated and other specific changes would be made which would not, however, affect the invention as here disclosed. In the paragraphs which follow the control circuit of FIG. 6 will be discussed, section by section, from a functional point of view.

Current is supplied to the circuit by lines L1, L2. The lines are directly connected to the main motor 30 which may be assumed to operate continuously. For the purpose of controlling the clutch 35 and brake 90 the solenoid 38 associated with the air valve 37 is connected in series with the switch S2 which forms a part of the regular press circuitry. Thus when the switch S2 is closed, energization of the solenoid causes air under pressure to be furnished to the air line 36 to engage the clutch 35 and disengage the brake 90. This causes rotation of the gearing shown in FIG. 2 and rotation of the eccentrics 45, 65 to apply a downward pull to the connecting rods 50-80 so that the slide begins to descend at a relatively high speed. Such descent continues until the slide is approaching the dead center condition, say, at an angle of 160° of rotation of the shaft 45a which is associated with the eccentric 45, which eccentric determines the dead center condition of the slide. Signaling of the approach is accomplished by a limit switch LS1 having a cam 200 which closes the switch between the 160° and 220° positions while leaving the switch open at all other times. The switch LS1 is connected in series with the switch S1 forming a part of the regular press control and in series with a molding cycle switch SW. The switches which together complete a circuit at the 160° position are in series with a main relay MR having normally open contacts S3, S4 and a normally closed contact S5, which is in series with the clutch and brake solenoid 38. Opening of contact S5 drops out solenoid 38 venting air pressure from line 36 which disengages clutch 35 and sets the brake 90 associated with the main drive motor. Thus, at 160°, the main drive motor is no longer effective to drive the slide.

At the same time closure of contact S3 is caused to energize the slow drive motor 101 so that the slide continues its movement into dead center position at low speed. This is accomplished by a slow drive relay SDR having normally open contacts S6, S7 and S8. Closure of contact S7 energizes solenoids 116 which, through air valve 115, pressurizes the air actuator 114 to release the brake shoes 112. Closure of contact S8 furnishes current to the slow drive motor 101 from line L2. Rotation of the motor 101 driving the ring gear 105 connected to the stationary brake member 92, previously mentioned, rotates the gearing shown in FIG. 2 so that the slide continues its final movement toward dead center.

In one embodiment of the present invention means are provided for increasing the pressure in the hydraulic overload control line OCL at the 160° position, i.e., prior to dead center, and for maintaining the high pressure until the slide is ready to move out of its dead center position following the curing cycle. To achieve the high pressure in the line OCL air is fed to the air inlet 164 of the pressure valve PV through a pressure selector valve 210 which is operated by a solenoid Y and which is connected to a low pressure regulator 211 and a high pressure regulator 212. Both of the regulators receive air via a line 213 from a supply 214. The regulators 211, 212 will be understood to be conventional pressure regulators which are respectively set for low and high values of pressure. In a practical case the low value of pressure may be that which is comparable to the pressure applied to the overload poppet valves when the press is used for its normal metal working purpose. The high pressure setting is that which will resist compression molding forces which, in accordance with the invention may, and normally will, exceed the nominal rating of the press. In utilizing the embodiment of the invention shown in FIG. 6 it will be understood that the pull rod adjustments 52-82 (FIG. 2) are such as to develop the requisite force to maintain closure between the mold sections when the slide is at dead center.

Accordingly, in carrying out the invention, the contact S6 is connected in series with the solenoid Y so that, simultaneously with the actuation of the slow drive at the 160° position, the solenoid is energized to switch the air valve 210 so that the output from the high pressure regulator 212 is connected to the inlet of the pressure valve PV, the high air pressure causing a high hydraulic fluid pressure to exist in the control line OCL. Applying higher pressure below the overload poppet increases the pressure of the fluid confined in the chamber 136 adjacent the overload piston 133 (FIG. 3) by reason of the upward feeding of pressure fluid through the check valve 150. While the overload poppet valve 140 has been taken by way of example in discussing the effect of an increase of pressure, it will be understood that pressure is similarly increased in the overload devices OL2, OL3, and OL4 at the remaining corners of the slide. As a result high pressure is developed at the mold sections as the slide completes its movement into dead center position without tripping any of the overloads.

In accordance with one of the aspects of the invention means are provided, at the 180° position, for bringing the slide to a stop and for starting a timer which times out a predetermined curing interval. For this purpose a second limit switch LS2 having a cam 200a which is closed from 180° to 360° is provided on the shaft 45a associated with the eccentric 45. The contact of the limit switch LS2 is connected in series with the winding of a timer clutch TC associated with a timer T. The timer T does not per se form the crux of the present invention and is of a type which is commercially available, so that a brief description of its construction and operation shall suffice. The timer includes a timing motor (not shown) which is fed through timer terminals 221, 222. The terminal 221 is connected in series with the switches SW and S1 so that the timer motor begins to rotate as the slide begins its downward movement. This does not, however, serve to initiate the timed interval. This function is accomplished by the timer clutch TC which serves to couple the timer motor to the time-responsive member within the timer. Until such coupling occurs the timer motor rotates idly. The timer clutch, in the present embodiment, not only initiates the timed interval but serves to operate a normally open contact TCS1 and a normally closed contact TCS2. After the timed interval has been timed out, which in a practical case may be a period of several minutes, timer output contacts are actuated. Such output contacts include a normally closed contact TS1 and two normally open contacts TS2, TS3. As a result, when the limit switch LS2 closes at the 180° position to begin the timed interval, closing of the contact TCS1, which bridges contact S6, insures continuation of current flow to the solenoid Y and thus continuation of the high pressure condition at the overload devices so that the mold sections continue to be held together at high pressure during the curing cycle. Opening of contact TCS2, however, drops out the slow drive relay SDR, opening contacts S6, S7 and S8. The opening of contact S6 is idle because of prior closure of contact TCS1. Opening of contact S7, by dropping out solenoid 116, removes air pressure from the actuator 114 permitting the brake shoes 12 associated with the slow drive motor to close under the urging of spring 113. At the same time opening of contact S8 de-energizes the slow drive motor and the slide comes to rest at its dead center, 180°, position.

It will be understood that suitable means are provided for heating the mold sections and that nothing further occurs until the timer T times out the curing cycle.

Means are provided, triggered at the end of the curing cycle, for reducing the pressure applied to the overload release devices and for bleeding the fluid which is captive in the overload release devices to a relatively low pressure thereby to permit a slight retreating movement of the slide, with relief of the reaction force exerted by the slide and a reduction of the pressure of the bearing surfaces of the connecting rods and associated drive elements which are subjected to the slide reaction force. When the pressure has been reduced to a low level then, and only then, is the slow drive motor actuated to produce movement of the slide upwardly out of its dead center position. Thus upon timing out of the curing interval contact TS1 is opened, breaking the circuit to solenoid Y, causing the solenoid to drop out so that low pressure regulator 211 is switched into active position, and the high pressure regulator is isolated, thereby causing low air pressure to be applied to the valve PV, resulting in low hydraulic pressure in the control line OCL. This reduces the pressure which exists below the poppet. Simultaneously, the confined fluid is bled from the space 136. Bleeding takes place through a connection 236 into a line 237 which is connected to a bleed valve 238 which is controlled by a solenoid X. The valve 238 has an output line 239 which includes an adjustable orifice 240 which discharges into a sump 241.

For the purpose of shutting off the bleed valve 238 when the pressure is bled down to a sufficiently low value, a bleeder pressure switch BPS is provided which is connected to the bleeder line 236 via an orifice 242. The bleeder switch has a contact BPSS which is in series with solenoid X and which is arranged to close when subjected to high pressure and to open only when the pressure has been reduced to a desired low level. Thus, initially, and under the high pressure condition, contact BPSS will be closed so that when contact TS2 of the timer closes at the end of the timed interval a circuit is completed through contact S4 to the solenoid, energizing the solenoid for prompt bleeding of fluid through lines 237, 239 into the sump. Such bleeding continues until there is a pressure drop sufficient to open contact BPSS of the bleeder pressure switch, thus de-energizing the solenoid X which closes bleeder valve 238 so that there is no further bleeding of fluid. In a practical system the amount of fluid to be bled is small and the bleeding can be caused to take place rather promptly so that the pressure of the confined fluid in the space 136 within the overload cylinder is reduced along with, if not prior to, the reduction of fluid pressure below the overload poppet so that the poppet need not unseat incident to the switch from the high pressure to the low pressure condition.

For triggering movement of the slow drive mechanism when adequately low pressure has been achieved, a detector pressure switch DPS is provided connected to the line OCL and having a contact DPSS. The detector pressure switch is preferably fed through a restricted orifice 245 which is bypassed by a ball check valve 246. As a result of using the orifice, a brief time delay is secured and the detector pressure switch is not subjected to any sudden pressure surges.

It will be recalled that the contact TCS2 associated with the timer clutch de-energized the slow drive relay with the slide in dead center position at the beginning of the timed interval to terminate the slow drive. At the end of the timed interval closure of contact TS3 by the timer is, of itself, ineffective to reenergize the slow drive relay since the detector contact DPSS is in series therewith, the latter contact being open until the pressure is at a low value. Because of the delay in operation of the detector pressure switch by reason of the throttled orifice 245 in series therewith, adequate time, on the order of a few seconds, is provided for the lubricating oil to interpose itself between the bearing surfaces to insure that all bearings are lubricated. It may be noted that lubricant tends to be squeezed out of the bearings not only because of the high molding pressure but because of the fact that the pressure is sustained over a long curing interval on the order of several minutes. The latter condition does not exist when the press is used for its normal metal working purposes, with the slide kept in motion at bottom dead center.

When the detector switch contact DPSS closes a circuit is made through contact S3, TS3 to the slow drive relay closing the contacts S6, S7 and S8 on this relay. Closure of contact S6 is idle since contact TS1 on the timer has opened at the end of the timed interval. Closure of contact S7 pressurizes the actuator 114 thereby opening the brake shoes 112 of the slow drive motor. Closure of contact S8 turns on the slow drive motor so that the slide proceeds to move out of its dead center position. Such movement continues until the 220° position is reached whereupon the limit switch LS1 drops open. Opening of the LS1 contact drops out relay MR, opening the contacts S3, S4 associated therewith and closing the contact S5. Opening of contact S3 drops out the slow drive relay SDR opening contacts S7, S8 to terminate the slow drive. Opening of contact S4 is idle since the solenoids which it feeds have already been dropped out, solenoid X by opening a bleeder contact BPSS and solenoid Y by the opening of timer contact TS1.

However, closure of contact S5 energizes the solenoid 38 to pressurize the air line 36 releasing the brake 90 and engaging the clutch 35 so that the main motor is coupled to the drive shaft for raising of the slide at high speed to its upper position.

At the upper position the regular press "run" control causes opening of contact S2 to drop out the solenoid 38, removing pressure from the line 36 to set the brake 90 and disengage the clutch 35 bringing the slide to rest and completing an operating cycle.

At the top, or 360°, position the second limit switch LS2 drops out thereby double opening (with contact S1) the circuit to the timer clutch TC, resetting the timer.

The above discussion has assumed that means are provided for stripping the molded work piece from the mold at the time that the mold sections are opened. Such stripping means may be conventional and need not be discussed. In any event the work piece may be removed by the press operator and a new blank substituted before the push button PB is pressed to initiate a new molding cycle.

Use of the present invention not only enables a conventional type of metal working press to be utilized for plastic compression molding, thereby saving the expense of a molding press, but achieves a degree of molding efficiency which is difficult to achieve in a molding press of conventional design. This is due to the fact that the time required for a complete cycle may be minimized due to the fast descent and fast retraction of the slide which is characteristic of a metal working press. It is particularly noteworthy that the force applied to the mold sections may exceed the nominal rating of the press without overstraining the press and without interfering with continuity of lubrication so that a long useful life is assured. The conventional overload release devices are, in carrying out the invention, used to affect the pressure which is exerted by the slide, in other words they are used actively, which is to be contrasted with the passive overload tripping function to which such devices have been limited in the past.

In the embodiment of the invention which has been discussed above the pressure at the mold sections is developed by reason of the fact that interference exists at the mold sections due to the setting of the adjustment devices 52–82 associated with the pull rods, and with the force being generated by movement of the eccentrics 45, 65 into dead center position. Thus high reaction force is being developed at the mold sections at the time that the slide is still moving into its lower dead center position. While the high pressure tends to squeeze oil from the bearings of the connecting rods and associated reaction elements, movement into dead center at high pressure is not considered disadvantageous since it takes time for the oil to be squeezed from between the bearing surfaces. Thus the bearings continue to be lubricated at least until the slide comes to rest on lower dead center.

However, in accordance with an alternate embodiment of the invention, means are provided for deferring the application of high reaction pressure at the mold sections until the slide has been deposited in its lower dead center position. More specifically, in accordance with an alternate embodiment of the invention, means are provided for exhausting a portion of the hydraulic fluid confined in the spaces 136 of the overload devices during the non-working portion of the cycle so that the slide is in a position which is slightly retracted, or backed off, with respect to the pull rods 51–81 as it moves downwardly toward its dead center position. The fact that the slide is backed off prevents any substantial reaction force from being built up between the mold sections as the dead center position is approached and achieved. Thereafter, with the slide stationary, high pressure is applied to the overload devices, pumping them up to take up the lost motion between the pull rods and the slide. The final movement of the slide toward the mold sections is therefore brought about by the pumping of the fluid into the overload devices to generate the desired high level of molding pressure.

Figure 7:
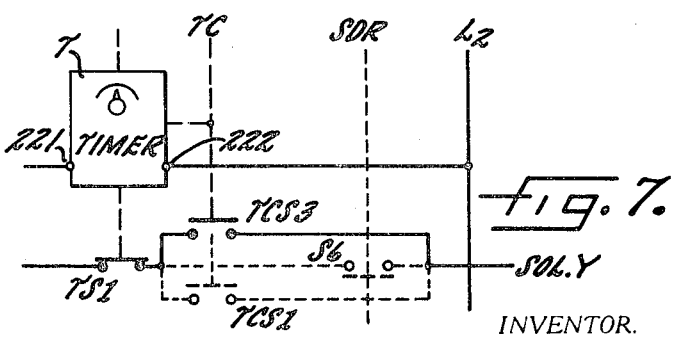
FIG. 7 is a fragment of the drawing of FIG. 6 showing provision for delaying application of high pressure for pumping up the overload release cylinder after the slide is in its dead center position.

The modified control arrangement generally corresponds to that disclosed in FIG. 6 with certain minor but significant modifications set forth in FIG. 7. Specifically, contact S6 on the slow drive relay SDR is bridged so that the slow drive relay can no longer affect the solenoid Y. Secondly, the normally open contact TCS1, when formerly bridged contact S6, is omitted and a new normally open contact TCS3, coupled to the timer clutch, is interposed in series with the timer contact TS1. The effect of this change is that the solenoid Y, which causes application of the high pressure, is not energized simultaneously with energization of the slow drive motor as the latter drives the slide into its dead center position. On the contrary the circuit to the solenoid Y is closed, by closure of contact TCS3, by the clutch winding at the beginning of the timed interval when the slide is stationary. Solenoid Y remains energized, to sustain the high pressure, until the end of the timed interval at which time opening of timer contact TS1 breaks the circuit to solenoid Y to switch the low pressure regulator 211 into action thereby to produce low pressure in the overload control line OCL. In short, the change insures that high pressure will be applied to the slide only when the slide is stationary and when no relative movement is taking place at the connecting rod bearings.

Operation of the second embodiment of control circuit (FIG. 7) is enhanced by the presence of the counterbalancing air rams 20 which support the weight of the slide and the top mold section. Preferably the pressure exerted by the air rams which are fed from a source of air at regulated pressure (not shown) is sufficiently great so that a net upward force is applied to the slide, a force which is in a direction to squeeze the fluid confined in space 136 in the overload release devices out through the bleed connection 236 as long as the solenoid X is energized, that is, as long as contact BPSS of the bleeder pressure switch is closed. It will be apparent that the bleeder pressure switch may be adjusted so as to remain closed by reason of the upward force applied to the slide by the counterbalancing rams during the time that the slow drive mechanism is separating the mold sections and prior to the time that the regular drive motor takes over. In short, it is contemplated, in the second embodiment, that the upward force on the slide is capable of exerting sufficient pressure upon the fluid in the space 136, with the pressure switch BPS being set to open at such low value, that at least some of the fluid is squeezed out of the space, as the slide begins, or executes, its upward movement. Thus when the slide is subsequently moved, substantially free of loading, into its bottom dead center position, the overload devices OL1–4 may be "pumped up" to apply the desired high force to the slide and mold sections. If it is desired to permit bleeding to occur during the full upward stroke of the slide, the contact S4 under relay MR may, if desired, be jumpered.

It will be apparent, then, that the two separate embodiments of the invention differ in the time of application of the high pressure and the fact that the high pressure is developed, in the second case, by pumping of hydraulic fluid into the overload cylinder.

What I claim is:

1. A metal working power press adapted for compression molding of plastic products comprising, in combination, a frame, a slide, driving means including a main drive motor, clutch, crank shaft and connecting rod for reciprocating the slide, the driving means having bearings and a source of lubricant in communication therewith, a brake having a rotatable braking member coupled to the crank shaft and having a relatively stationary member coupled to the frame, said driving means including an auxiliary slow speed drive mechanism interposed between the relatively stationary member and the frame, an hydraulic overload release device having a piston and cylinder interposed between the connecting rod and the press slide including pressure control means for establishing a low fluid pressure therein which is sufficient to maintain the piston and cylinder bottomed during normal metal working operation of the press while nevertheless permitting yielding of the slide in the face of an overload reaction force, means for increasing the pressure in the overload release device beyond the normal pressure, means responsive to the approach of the slide to dead center position for (a) de-energizing the clutch, (b) setting the brake and (c) turning on the slow drive mechanism, a timer, means responsive to arrival of the slide at the dead center position for de-energizing the slow speed drive mechanism and for starting the timer, means responsive to expiration of the timed interval for bleeding pressure fluid from the overload release device thereby to reduce the reaction force on the slide and therefore the pressure on the bearing surfaces for reentry of pressurized lubricant which has been squeezed out from between the surfaces, and means actuated when the pressure in the overload release is reduced to low level for energizing the drive means for moving the slide to its upraised position in completion of an operating cycle.

2. The combination as claimed in claim 1 in which the pressure control means is switchable between low and high pressure conditions and in which means are provided for switching the pressure control means into its high pressure condition upon approach of the slide to dead center position and to restore it to its low pressure condition upon expiration of the timed interval.

3. The combination as claimed in claim 1 in which means are provided for energizing the slow drive mechanism when the slide is in dead center position and after the pressure in the overload release device is reduced to low level and in which means are provided responsive to predetermined movement of the slide out of dead center position for energizing the clutch and releasing the brake for high speed return of the slide to its upraised position.

4. A metal working press adapted for compression molding of plastic products comprising, in combination a frame, a slide, driving means including a main drive motor, clutch, crank shaft and connecting rod for reciprocating the slide, said driving means having bearings and a source of lubricant in communication therewith, an hydraulic overload release device having a piston and cylinder interposed between the connecting rod and the press slide including pressure control means for establishing alternative low and high fluid pressure conditions therein, means for switching the pressure control means to the high pressure condition, means for stopping the slide at bottom dead center position and for maintaining the slide in such position for a predetermined time interval, means operated at the end of the time interval for bleeding pressure fluid from the overload release device thereby to reduce the pressure therein to a level which is sufficiently low as to permit reentry of lubricant which has been squeezed out from between the bearing surfaces, and means actuated when the pressure in the overload release mechanism is reduced to low level for energizing the driving means for movement of the slide out of its dead center position in completion of an operating cycle.

5. A metal working power press adapted for compression molding of plastic products comprising, in combination, a frame, a slide, driving means including a main drive motor, clutch, crank shaft and connecting rod for reciprocating the slide, said driving means having bearings and a source of pressurized lubricant in communication therewith, a brake having a rotatable member coupled to the crank shaft and having a relatively stationary member coupled to the frame, an hydraulic overload release device having a piston and cylinder interposed between the connecting rod and the press slide with provision for yielding upon development of a predetermined reaction force upon the slide, means for establishing high pressure in the cylinder during the time that the slide is in its dead center position, means for maintaining the slide in its dead center position for a sufficient time interval to effect curing of the plastic product, means operated at the end of the time interval for bleeding pressure fluid from the overload release device thereby to reduce the reaction force on the slide and therefore the pressure on the bearing surfaces for insuring reentry of pressurized lubricant between the surfaces, and means actuated when the pressure in the overload release device is reduced to low level for energizing the driving means for moving the slide to its upraised position in completion of an operating cycle.

6. In a power press, the combination comprising a frame, a slide, driving means including a main drive motor, clutch, crank shaft and connecting rod for reciprocating the slide, said driving means having bearings and a source of lubricant in communication therewith, a brake having a rotatable member coupled to the crank shaft and having a relatively stationary member coupled to the frame, said driving means including a slow drive mechanism interposed between the relatively stationary member and the frame, a slide counterbalancing means for applying a counterbalancing force which exceeds the weight of the slide for biasing the slide upwardly, an hydraulic overload release having a piston and cylinder interposed between the connecting rod and the press slide including pressure control means for establishing a pressure therein which is sufficiently low as to be overcome by the force of bias thereby to squeeze at least a portion of the fluid from the cylinder, high pressure means for adding fluid to the cylinder to expand the cylinder and to develop a high pressure therein, means responsive to the approach of the slide dead center position for (a) de-energizing the clutch, (b) setting the brake, and (c) turning on the slow speed drive mechanism, a timer, means responsive to arrival of the slide at the dead center position for (1) de-energizing the slow speed drive mechanism, (2) starting the timer and (3) activating the high pressure means so that pressure fluid is fed to the cylinder accompanied by build up of high pressure therein for exertion of molding pressure by the slide, means responsive to expiration of the timed interval for bleeding of pressure fluid from the cylinder thereby to reduce the reaction force on the slide and the pressure at the bearing surfaces for reentry of lubricant between the surfaces, and means actuated when the pressure in the cylinder is reduced to low level for energizing the driving means thereby to move the slide to its upraised position in completion of an operating cycle.

References Cited

UNITED STATES PATENTS

| | | | |
|---|---|---|---|
| 2,085,799 | 7/1937 | Glasner | 72—450 |
| 2,434,849 | 1/1948 | Hess | 100—51 |
| 3,036,355 | 5/1962 | Mays | 425—167 |
| 3,044,138 | 7/1962 | Lesnett | 425—167 |

LOWELL A. LARSON, Primary Examiner

G. P. CROSBY, Assistant Examiner

U.S. Cl. X.R.

425—107, 154, 157, 419, 450